United States Patent
Hansen

(10) Patent No.: US 11,797,489 B2
(45) Date of Patent: *Oct. 24, 2023

(54) SYSTEM AND METHOD FOR USING LOCAL STORAGE TO EMULATE CENTRALIZED STORAGE

(71) Applicant: VMware, Inc., Palo Alto, CA (US)

(72) Inventor: Jacob Gorm Hansen, Ryomgaard (DK)

(73) Assignee: VMware, Inc., Palo Alto, CA (US)

( * ) Notice: Subject to any disclaimer, the term of this patent is extended or adjusted under 35 U.S.C. 154(b) by 793 days.

This patent is subject to a terminal disclaimer.

(21) Appl. No.: 16/384,606

(22) Filed: Apr. 15, 2019

(65) Prior Publication Data

US 2019/0243806 A1  Aug. 8, 2019

Related U.S. Application Data

(60) Division of application No. 15/274,866, filed on Sep. 23, 2016, now abandoned, which is a continuation of
(Continued)

(51) Int. Cl.
*G06F 16/178* (2019.01)
*G06F 16/10* (2019.01)
(Continued)

(52) U.S. Cl.
CPC ........ *G06F 16/178* (2019.01); *G06F 9/45558* (2013.01); *G06F 11/2097* (2013.01);
(Continued)

(58) Field of Classification Search
None
See application file for complete search history.

(56) References Cited

U.S. PATENT DOCUMENTS 6,058,493 A  5/2000  Talley
6,192,472 B1  2/2001  Garay et al.
(Continued)

OTHER PUBLICATIONS

Hakim Weatherspoon et al., "Antiquity: Exploring a Secure Log for Wide-Area Distributed Storage." EuroSys '07: Proceedings of the 2007 Conference on EuroSys, pp. 371-384, New York, NY 2007. ACM Press.
(Continued)

*Primary Examiner* — Tarek Chbouki
*Assistant Examiner* — Loan T Nguyen
(74) *Attorney, Agent, or Firm* — Dinsmore & Shohl LLP

(57) ABSTRACT

A cluster of computer systems, each of which is configured with a virtualization software layer to support execution of virtual computing instances, includes a first computer system in which a first virtual computing instance is executing, the first computer system including a first local storage unit in which a first log file is stored to capture write operations to a virtual disk of the first virtual computing instance. The cluster also includes a second computer system, networked to the first computer system, in which a second virtual computing instance is executing, the second computer system including a second local storage unit in which a second log file is stored to capture write operations to a virtual disk of the second virtual computing instance and in which a replica of the first log file is stored.

20 Claims, 7 Drawing Sheets

Related U.S. Application Data application No. 13/734,186, filed on Jan. 4, 2013, now Pat. No. 9,454,446, which is a continuation of application No. 12/506,965, filed on Jul. 21, 2009, now Pat. No. 8,352,482.

(51) Int. Cl.

| | | |
|---|---|---|
| *G06F 16/20* | (2019.01) | |
| *G06F 16/23* | (2019.01) | |
| *G06F 16/188* | (2019.01) | |
| *G06F 11/20* | (2006.01) | |
| *G06F 9/455* | (2018.01) | |
| *G06F 11/14* | (2006.01) | |

(52) U.S. Cl.
CPC ............ *G06F 16/10* (2019.01); *G06F 16/188* (2019.01); *G06F 16/20* (2019.01); *G06F 16/23* (2019.01); *G06F 11/1484* (2013.01); *G06F 11/2025* (2013.01); *G06F 11/2041* (2013.01); *G06F 11/2048* (2013.01); *G06F 2009/45583* (2013.01); *G06F 2009/45595* (2013.01)

(56) References Cited

U.S. PATENT DOCUMENTS

| 7,069,452 | B1* | 6/2006 | Hind ................ G06F 21/572 |
| | | | 713/1 |
| 7,320,076 | B2 | 1/2008 | Caronni |
| 7,426,566 | B2 | 9/2008 | Godwin et al. |
| 7,447,854 | B1* | 11/2008 | Cannon ............... G06F 11/1451 |
| | | | 711/162 |
| 7,519,721 | B2 | 4/2009 | Godwin et al. |
| 7,548,915 | B2 | 6/2009 | Ramer et al. |
| 7,548,928 | B1 | 6/2009 | Dean et al. |
| 7,555,674 | B1 | 6/2009 | Wang |
| 7,685,095 | B2 | 3/2010 | Ghosh et al. |
| 7,783,682 | B1 | 8/2010 | Patterson |
| 7,802,251 | B2 | 9/2010 | Kitamura |
| 7,873,168 | B2 | 1/2011 | Tateoka et al. |
| 7,916,871 | B2 | 3/2011 | Brookner et al. |
| 7,930,547 | B2 | 4/2011 | Hao et al. |
| 8,046,550 | B2 | 10/2011 | Feathergill |
| 8,135,930 | B1 | 3/2012 | Mattox et al. |
| 8,225,029 | B2 | 7/2012 | Meng et al. |
| 8,234,518 | B2 | 7/2012 | Hansen |
| 8,296,759 | B1 | 10/2012 | Hutchins et al. |
| 8,352,482 | B2 | 1/2013 | Hansen |
| 8,352,490 | B2 | 1/2013 | Hansen |
| 8,386,494 | B2 | 2/2013 | Vachuska |
| 2002/0059329 | A1 | 5/2002 | Hirashima et al. |
| 2002/0133608 | A1 | 9/2002 | Godwin et al. |
| 2002/0165902 | A1 | 11/2002 | Robb et al. |
| 2003/0140204 | A1* | 7/2003 | Ashton ............... G06F 11/1458 |
| | | | 711/162 |
| 2004/0098425 | A1 | 5/2004 | Wiss et al. |
| 2004/0175000 | A1 | 9/2004 | Caronni |
| 2006/0005189 | A1 | 1/2006 | Vega et al. |
| 2006/0136713 | A1 | 6/2006 | Zimmer et al. |
| 2006/0155667 | A1 | 7/2006 | Tolba |
| 2007/0094659 | A1 | 4/2007 | Singh et al. |
| 2007/0220605 | A1 | 9/2007 | Chien |
| 2008/0095375 | A1 | 4/2008 | Tateoka et al. |
| 2008/0147599 | A1 | 6/2008 | Young-Lai |
| 2008/0155169 | A1 | 6/2008 | Hiltgen et al. |
| 2008/0189428 | A1 | 8/2008 | Godwin et al. |
| 2008/0235765 | A1 | 9/2008 | Shimizu |
| 2009/0245518 | A1 | 10/2009 | Bae et al. |
| 2010/0011178 | A1 | 1/2010 | Feathergill |
| 2010/0050249 | A1 | 2/2010 | Newman |
| 2010/0107158 | A1 | 4/2010 | Chen et al. |
| 2010/0175061 | A1 | 7/2010 | Maeda et al. |
| 2010/0189014 | A1 | 7/2010 | Hogan et al. |
| 2011/0022574 | A1 | 1/2011 | Hansen |
| 2011/0022883 | A1 | 1/2011 | Hansen |
| 2011/0099187 | A1 | 4/2011 | Hansen |
| 2011/0145188 | A1 | 6/2011 | Vachuska |
| 2011/0276963 | A1 | 11/2011 | Wu et al. |
| 2011/0307530 | A1 | 12/2011 | Patterson |
| 2012/0066677 | A1 | 3/2012 | Tang |
| 2013/0124559 | A1 | 5/2013 | Hansen |

OTHER PUBLICATIONS

Office Action for U.S. Appl. No. 13/735,792 dated Mar. 1, 2015.
Naor et al., "Access Control and Signatures via Quorum Secret Sharing," Parallel and Distributed Systems, IEEE Transactions, 9(9):909-922 Sep. 1998.
Mazieres et al., "Building Secure File Systems Out of Byzantine Storage," PODC '02: Proceedings of teh Twenty-First Annual Symposium on Principles of Distributed Computing, pp. 108-117, New York, NY 2002, ACM Press.
International Search Report and Written Opinion from International Application No. PCT/US2010/042425 dated Mar. 2, 2011.

\* cited by examiner

SYSTEM AND METHOD FOR USING LOCAL STORAGE TO EMULATE CENTRALIZED STORAGE

CROSS-REFERENCE TO RELATED APPLICATIONS

This application is a divisional of U.S. patent application Ser. No. 15/274,866 entitled "System and Method for Using Local Storage to Emulate Centralized Storage" filed on Sep. 23, 2016, which is a continuation of U.S. patent application Ser. No. 13/734,186 entitled "System and Method for Using Local Storage to Emulate Centralized Storage" filed on Jan. 4, 2013, now U.S. Pat. No. 9,454,446, which is a continuation of U.S. patent application Ser. No. 12/506,965 entitled "System and Method for Replicating Disk Images in a Cloud Computing Based Virtual Machine File System" filed on Jul. 21, 2009, now U.S. Pat. No. 8,352,482. This application is further related to U.S. patent application Ser. No. 12/507,013, entitled "Method for Voting with Secret Shares in a Distributed System" filed Jul. 21, 2009, now U.S. Pat. No. 8,234,518, and U.S. patent application Ser. No. 12/604,334, entitled "Method and System for Locating Updated Operations in a Virtual Machine Disk Image" filed on Oct. 22, 2009, now U.S. Pat. No. 8,352,490, both of which are hereby incorporated by reference.

BACKGROUND OF THE INVENTION

Current enterprise level virtual machine file systems, such as VMware Inc.'s VMFS, are typically shared disk file systems that utilize an external storage device, such as a storage area network (SAN), to provide storage resources to virtual machines. These virtual machines are instantiated and run on one or more servers (sometimes referred to as a server cluster) that store their virtual machines' disk images as separate files in the SAN. Each server in the cluster runs a virtualization layer (sometimes referred to as a hypervisor) that includes an implementation of a virtual machine file system that coordinates the interaction of the server with the SAN. For example, each virtual machine file system on each server in a cluster implements and follows a common per-file locking protocol that enables virtual machines running on multiple servers to simultaneously access (e.g., read and write) their disk images in the SAN without fear that other servers may simultaneously access the same disk image at the same time.

FIG. 1 depicts one example of a network architecture for a cluster of virtualization servers utilizing a SAN. Each virtualization server $100_A$ to $100j$ is networked to SAN 105 and communicates with SAN 105 using SCSI-based protocols. As previously discussed, each virtualization server $100_A$ to $100j$ includes a hypervisor, such as 110A, that includes a virtual machine file system, such as $115_A$. Hypervisor $110_A$ provides virtualization support to enable its server $100_A$ to instantiate a number of virtual machines, such as $120_A$ through $125_A$. The disk images for each of virtual machines $120_A$ through $125_A$ are stored in SAN 105.

The network architecture of FIG. 1 provides protection against server failures because SAN 105 serves as a central storage resource that stores disk images for virtual machines of all the servers in the cluster. For example, if server $100_A$ experiences a hardware failure, any of the other servers in the cluster can "failover" any of virtual machines $120_A$ through $125_A$ by instantiating a new virtual machine and associating the newly created virtual machine with the failed virtual machine's disk image stored in SAN 105 (i.e., provided such server has sufficient computing resources to support the virtual machine).

However, SAN 105 itself becomes a potential bottleneck and a single point of failure. Furthermore, by its nature, the use of a central SAN limits the capability to scale the number of servers in a cluster and/or distribute the servers in the cluster over a wide-area network (WAN). Additionally, SANs have traditionally been one of the most expensive components of a data center, often costing more than the aggregate cost of the virtualization software and server cluster.

SUMMARY OF THE INVENTION

One or more embodiments of the invention provide a virtual machine file system that employs a replicated and decentralized storage system. In this system, as in warehouse-style or "cloud" computing systems, multiple networked servers utilize cheaper local storage resources (such as SATA disks) rather than a centralized SAN, even though they may be less reliable, because such a replicated and decentralized storage system eliminates the bottleneck and single point of failure of a SAN and also provides the potential for both incremental and large-scale data center growth by simply adding more servers. However, use of such local storage resources is also less reliable than use of a SAN. To improve reliability, data replication techniques that provide high availability and ensure the integrity and consistency of replicated data across the servers are employed.

According to an embodiment, a cluster of computer systems, each of which is configured with a virtualization software layer to support execution of virtual computing instances, includes a first computer system in which a first virtual computing instance is executing, the first computer system including a first local storage unit in which a first log file is stored to capture write operations to a virtual disk of the first virtual computing instance. The cluster also includes a second computer system, networked to the first computer system, in which a second virtual computing instance is executing, the second computer system including a second local storage unit in which a second log file is stored to capture write operations to a virtual disk of the second virtual computing instance and in which a replica of the first log file is stored.

DETAILED DESCRIPTION

Figure 1:
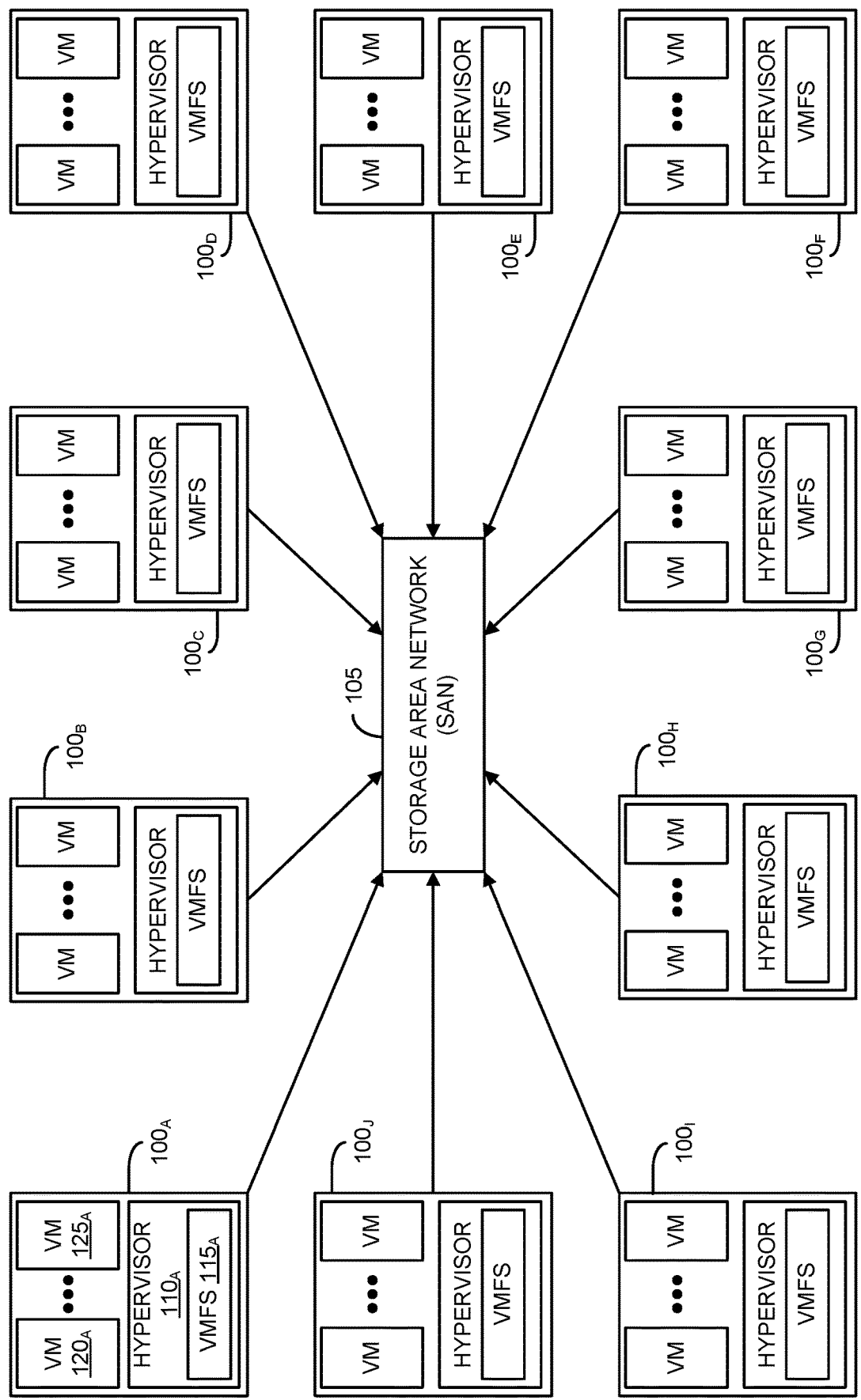
FIG. 1 depicts a network architecture for a cluster of virtualization servers utilizing a SAN.
Figure 2:
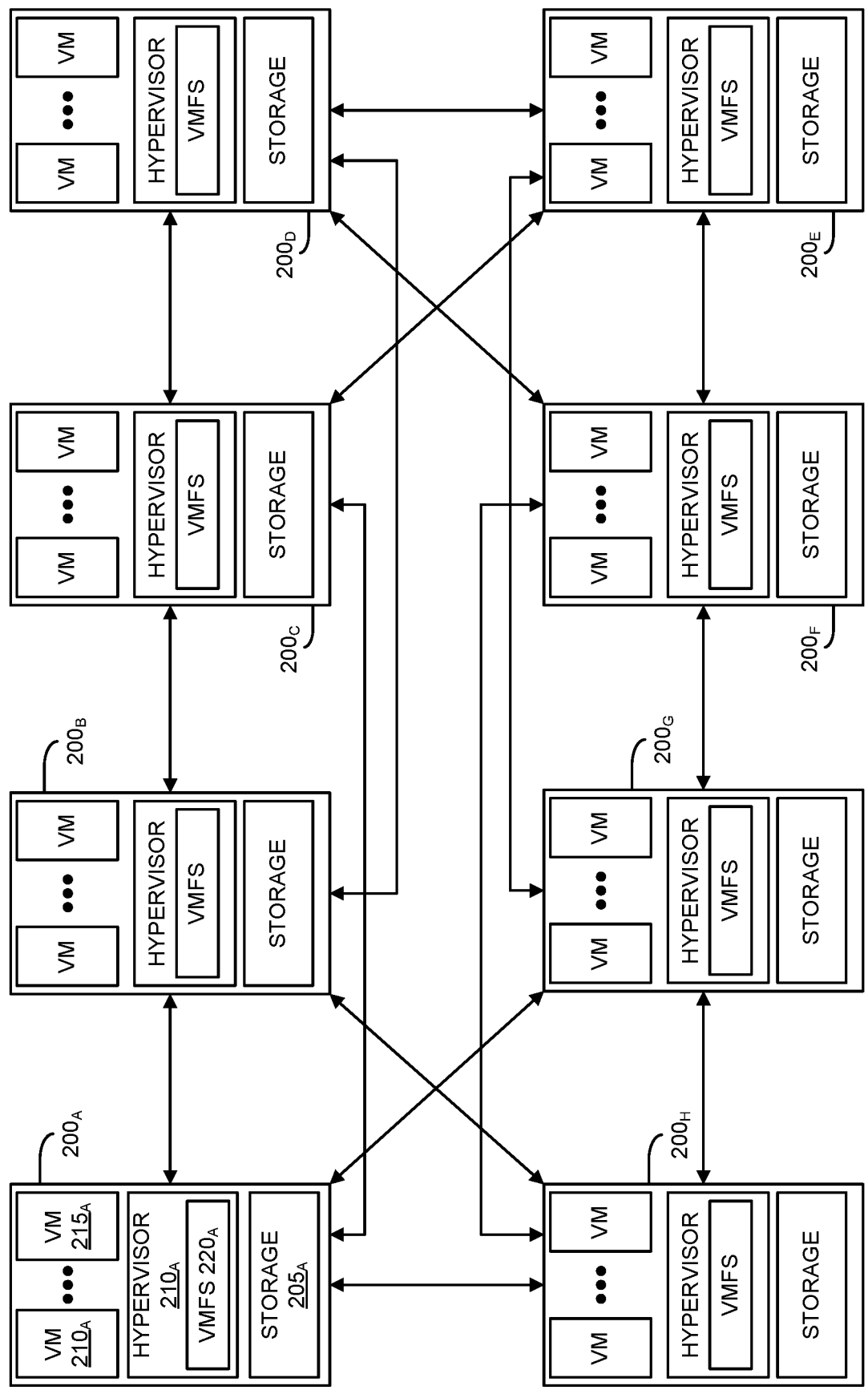
FIG. 2 depicts a network architecture using a replicated and decentralized storage system for a virtual machine file system, according to one or more embodiments of the present invention.

FIG. 2 depicts a network architecture using a replicated and decentralized storage system for a virtual machine file system, according to one or more embodiments of the present invention. In contrast to the network architecture of FIG. 1, in which virtualization servers 100', each including a virtual file system 115', a hypervisor 110' and one or more virtual machines 120', 125' communicate with a centralized SAN 105 to access stored disk images corresponding to their respective instantiated virtual machines, each of the virtualization servers $200_A$ to $200_H$ in the cluster of FIG. 2 has its own directly attached local storage, such as local storage $205_A$ for virtualization server $200_A$. As such, virtual machines $210_A$ to $215_A$ running on server $200_A$ store their disk images in local storage $205_A$. Storage in such a network architecture can therefore be considered "decentralized" because disk image data (in the aggregate) is stored across the various local storages residing in the servers. Each of virtualization servers $200_A$ to $200_H$ includes virtualization software, for example, a hypervisor such as $210_A$, that supports the instantiation and running of virtual machines on the server. Hypervisor $210_A$ further includes a virtual machine file system $220_A$ that coordinates and manages access to local storage $205_A$ by virtual machines $210_A$ to $215_A$ (i.e., to read from or write to their respective disk images).

Each of servers $200_A$ to $200_H$ is further networked to one or more of the other servers in the cluster. For example, server $200_A$ is networked to server $200_B$, server $200_C$, server $200_G$ and server $200_H$. As depicted in the network topology of FIG. 2, each server is networked to four other servers in the cluster and can reach another server in no more than one hop. It should be recognized, however, that the network topology of FIG. 2 is a simplified illustration for exemplary purposes and that any network topology that enables communication among the servers in a cluster can be used consistent with the teachings herein, including, without limitation, any ring, mesh, star, tree, point-to-point, peer-to-peer or any other network topology, whether partially connecting or fully connecting the servers. By removing a centralized SAN from the network architecture, embodiments of the present invention remove a potential bottleneck and point of failure in the architecture and are more easily able to scale storage for a virtualized data center in a cost efficient manner by incrementally adding servers utilizing local storage to the cluster.

Figure 3:
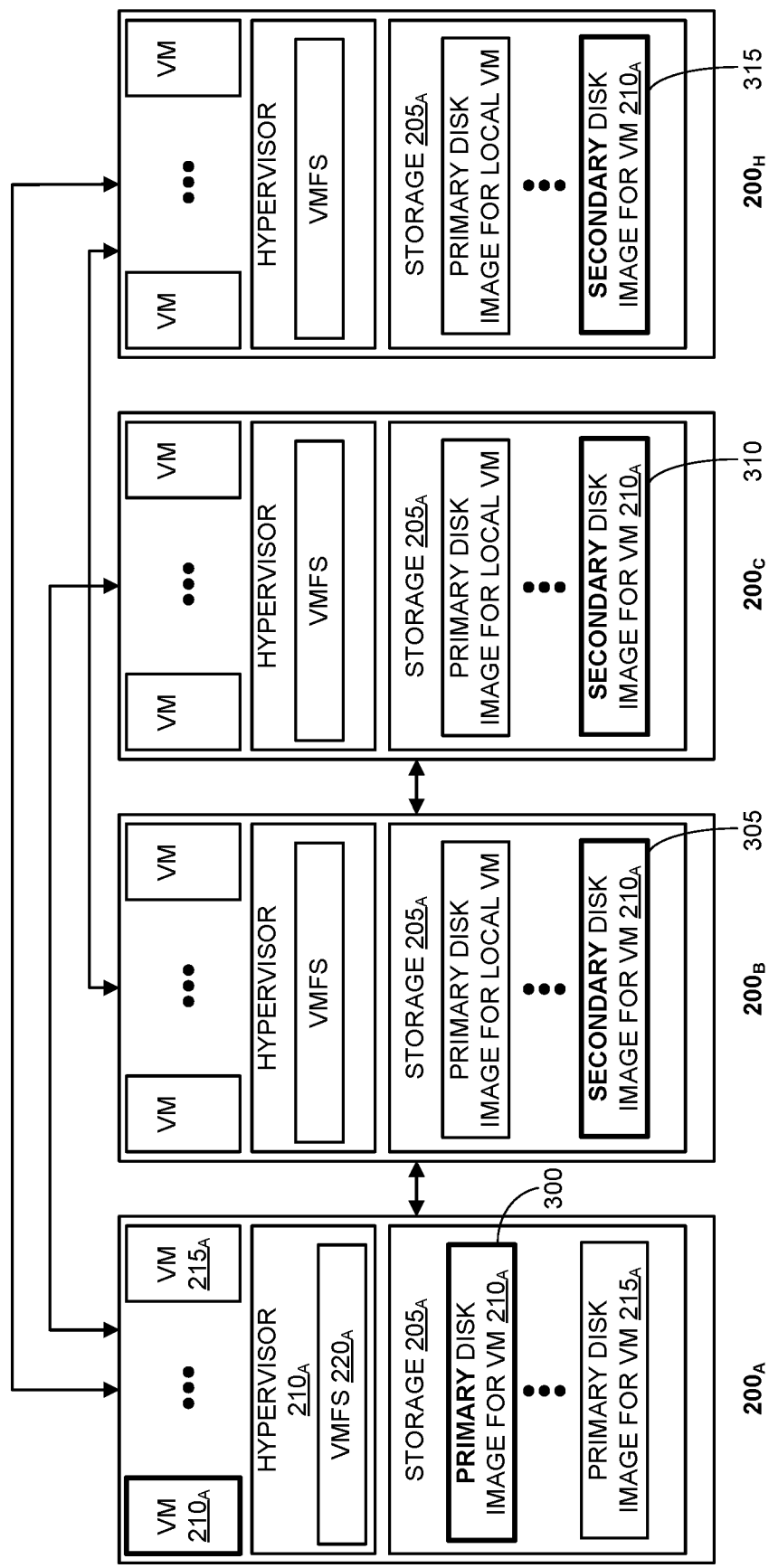
FIG. 3 depicts disk image replication for a virtual machine running on a server according to one or more embodiments of the present invention.

An embodiment of the invention that utilizes a network architecture similar to that of FIG. 2 replicates disk images across the local storages of servers in a cluster to provide server failure protection. If a server fails, another server in the cluster that has a locally stored replica of the disk image of a virtual machine in the failed server can failover that particular virtual machine. In one embodiment, a designated server in the cluster has responsibilities as a replication manager and may, for example, instruct server $200_A$ to replicate the disk image for virtual machine $210_A$ to the local storages of servers $200_B$, $200_C$ and $200_H$. As referred to herein, a server that is running a virtual machine is the "primary server" with respect to the virtual machine, and other servers that store replications of the virtual machine's disk image for failover purposes are "secondary servers." Similarly, a copy of the disk image of a virtual machine that is stored in the local storage of the primary server is a "primary" copy, replica or disk image, and a copy of the disk image of a virtual machine that is stored in the local storage of a secondary server is a "secondary" copy, replica or disk image. FIG. 3 depicts disk image replication for a virtual machine running on a server using a decentralized storage system, according to one or more embodiments of the present invention. In particular, virtual machine $210_A$ running on primary server $200_A$ utilizes a primary disk image 300 stored on local storage $205_A$ of server $200_A$ during normal operations. Primary disk image 300 is replicated as secondary disk images 305, 310 and 315, respectively, in the local storages of secondary servers $200_B$, $200_C$, and $200_H$.

Figure 4A:
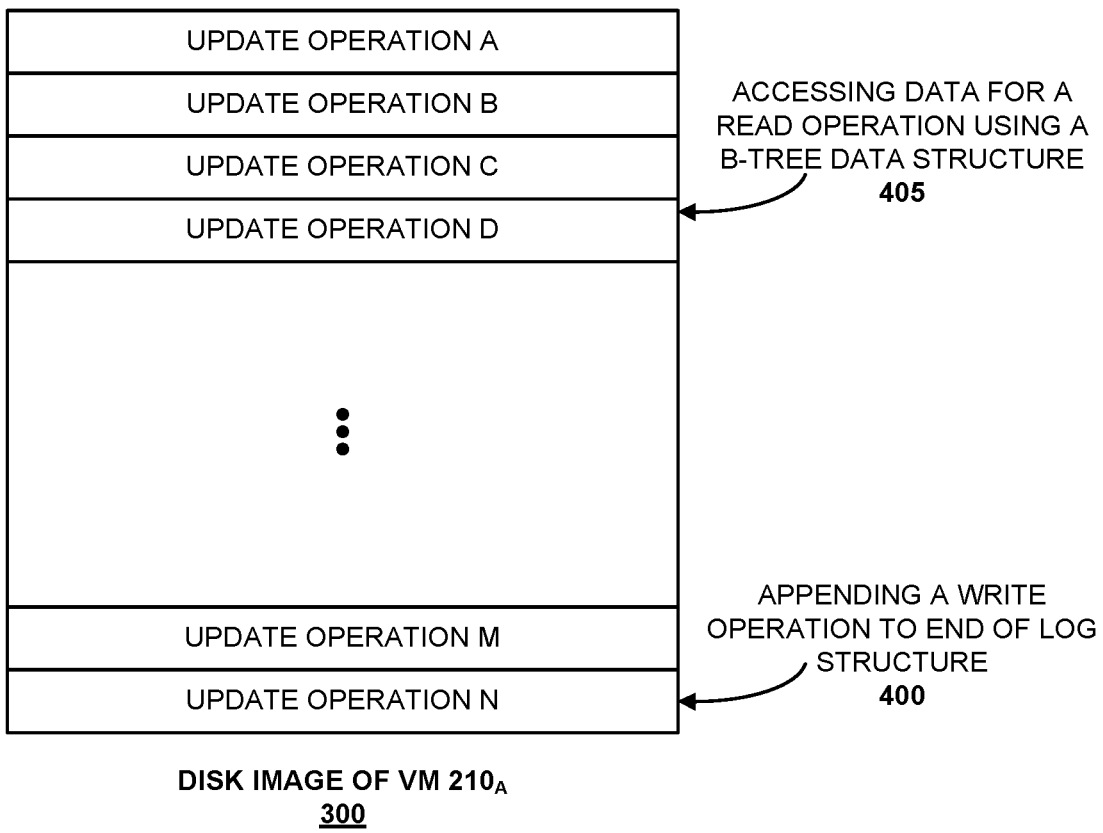
FIG. 4A depicts a log structure of a disk image of a virtual machine stored on local storage, according to one or more embodiments of the present invention.

FIG. 4A depicts a log structure of a disk image of a virtual machine stored on local storage, according to one or more embodiments of the present invention. As illustrated in FIG. 4A, disk image 300 for virtual machine $210_A$ running on server $200_A$ is structured as a temporally ordered log of update operations made to the disk. For example, when virtual machine $210_A$ issues a write operation (e.g., containing a logical block address from the virtual address space of the virtual machine and data to be written into the logical block address) to its disk, virtual machine file system $220_A$ receives the write operation and generates a corresponding update operation, such as update operation 400, and appends update operation 400 to the end of the log structure of disk image 300. In one embodiment, virtual machine file system $220_A$ further maintains a B-tree data structure that maps the logical block addresses referenced in write operations issued by virtual machine $210_A$ to physical addresses of local storage $205_A$ that reference locations of the update operations (and data residing therein) corresponding to the issued write operations. In such an embodiment, when virtual machine file system $220_A$ receives a write operation from virtual machine $210_A$, it additionally inserts the physical address corresponding to the update operation in the log structure of the disk image into the B-tree such that the physical address can be found by providing the logical block address of the write operation to the B-tree. This B-tree enables virtual machine file system $220_A$ to handle read operations issued by virtual machine $210_A$. For example, when virtual machine $210_A$ issues a read operation (e.g., containing a logical block address from the virtual address space of the virtual machine from which to read data) to its disk, virtual machine file system $220_A$ receives the read operation, obtains a physical address from the B-tree that corresponds to a previous update command 405 (e.g., from a prior completed write operation) stored in the log structure that contains the requested data, and retrieves the data for virtual machine $210_A$. Instead of a B-tree data structure, other similar tree or search data structure, such as but not limited to lookup tables, radix trees and the like, may be used.

Figure 4B:
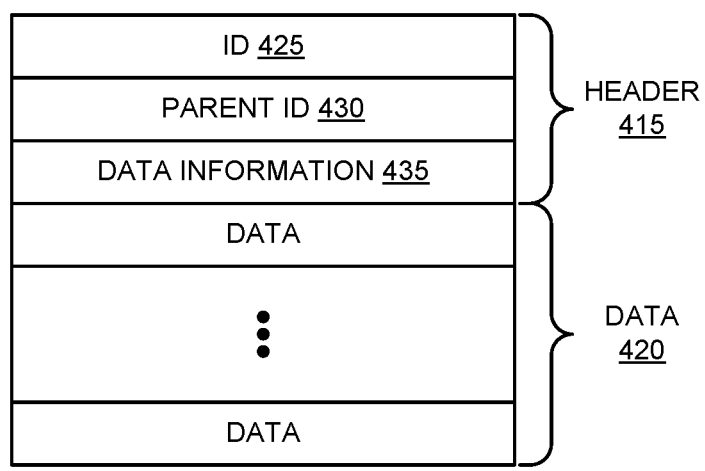
FIG. 4B depicts the internal data structure of an update operation of a disk image, according to one or more embodiments of the present invention.

FIG. 4B depicts the internal data structure of an update operation of a disk image, according to one or more embodiments of the present invention. An update operation stored in disk image 300, such as update operation 410 in FIG. 4B, contains a header portion 415 and data portion 420. Header portion 415 includes an id entry 425 that stores a public unique identification or id for the update operation, a "parent" id entry 430 that stores a private unique id of the preceding update operation stored in the log of disk image 300, and data information entry 435 that stores descriptive information about data portion 420 (e.g., amount of data, address locations, etc.).

In one embodiment of the present invention, a replicated decentralized storage system, such as that depicted in FIGS. 2 and 3, performs replication of a primary data image to secondary servers in a manner that avoids split-brain scenarios. A split-brain scenario can occur, for example, if the network connections of server $200_A$ fail, but virtual machine $210_A$ of server $200_A$ continues to otherwise operate normally and issue write operations that are stored as update operations in primary data image 300. Because server $200_A$ is no longer accessible by any other server in the cluster, in one embodiment, a designated server responsible for failover management may conclude that server $200_A$ has failed and therefore instruct server 200B to failover virtual machine $210_A$ utilizing its secondary disk image 305. In the event that the network connections for $200_A$ are subsequently restored, two different instantiations of virtual machine $210_A$ will be running on servers $200_A$ and 200B. Furthermore, the respective disk images 300 and 305 for virtual machine $210_A$ in server $200_A$ and server $200_B$ will not be properly synchronized. In order to prevent such split-brain situations, in which secondary servers inappropriately update their secondary replicas of a data image, a virtual machine file system of the primary server, according to an embodiment of the present invention, employs a master secret token that is known only to the primary server to ensure that only update operations propagated by the primary server are accepted by the secondary servers.

Figure 5:
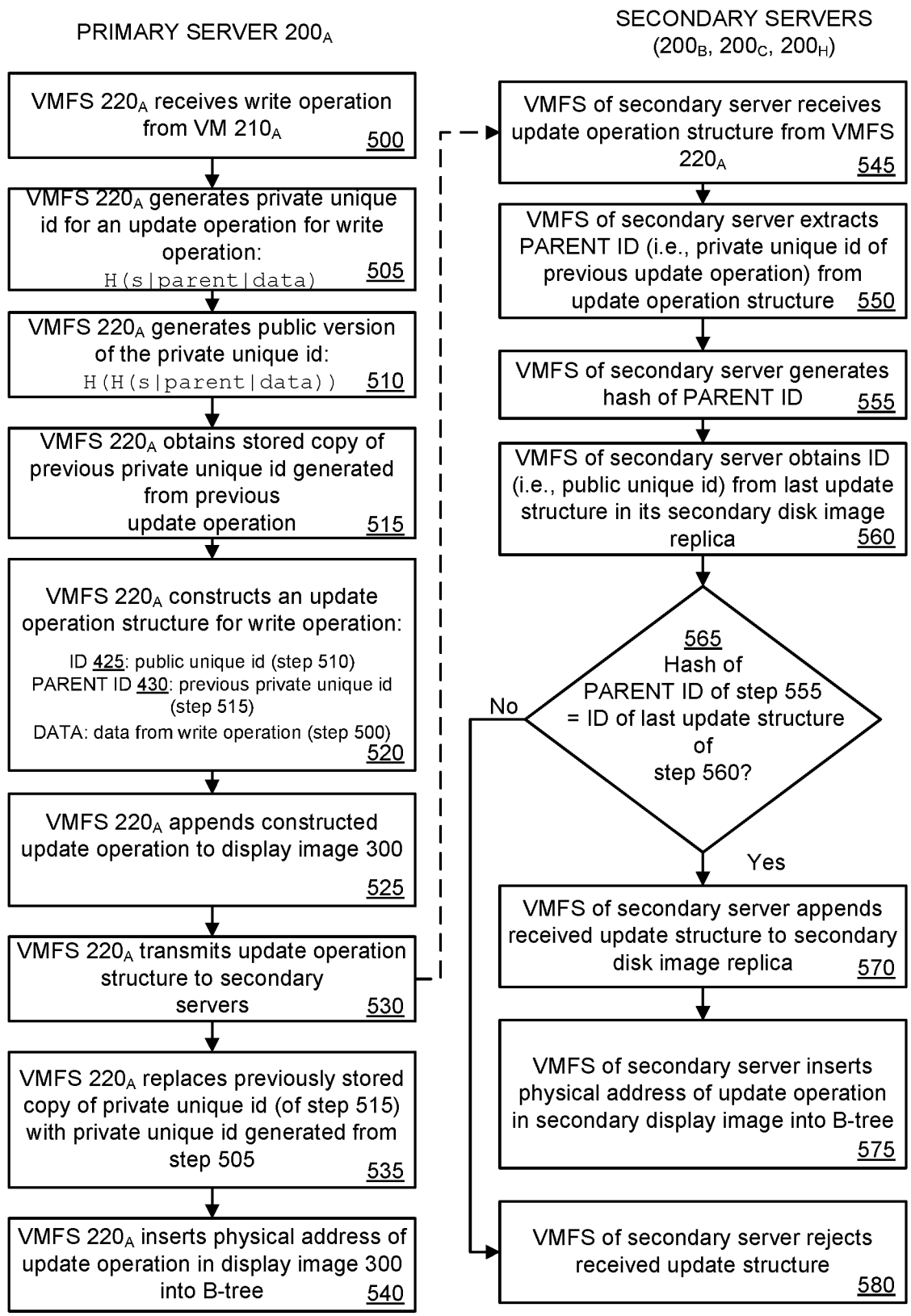
FIG. 5 depicts a flow chart for replicating a primary data image to secondary servers, according to one or more embodiments of the present invention.

FIG. 5 depicts a flow chart for replicating a primary data image on secondary servers, according to one or more embodiments of the present invention. While the steps of the flow chart reference structures of FIGS. 2, 3, 4A, and 4B, it should be recognized that any other network architectures, virtualization servers, disk image formats and update operation structures that are consistent with the teachings herein may be used in conjunction with the flow chart of FIG. 5. In step 500, virtual machine file system $220_A$ of primary server $200_A$ receives a write operation from virtual machine $210_A$. In step 505, virtual machine file system $220_A$ generates a private unique id for an update operation for the write operation. In one embodiment, the private unique id is generated by hashing a bitwise intersection of the primary server's $200_A$ master secret token, a parent id relating to the preceding update operation (stored as the last entry in the primary and secondary disk images), and the data for the write operation (or otherwise combining the data, parent id, master secret token in an alternative bitwise fashion such as concatenation, XOR, etc.), H (s | parent | data), where H is a cryptographic one way hash function such as SHA-1 or SHA-256, s is the master secret token, and parent is the parent id. In step 510, the private unique id is then hashed again (e.g., with the same or a different hashing function, depending upon the embodiment) to obtain a public unique id, H (H ($s_1$ parent| data)). In step 515, virtual machine file system $220_A$ obtains a stored copy of the previous private unique id generated from the previous update operation stored in primary disk image 300. In step 520, virtual machine file system $220_A$ constructs an update operation structure corresponding to the received write operation in which: (i) id entry 425 of the update operation structure is the public unique id generated in step 510; (ii) parent id entry 430 of the update operation structure is the previous private unique id obtained in step 515; and (iii) the data of the update operation structure is the data of the received write operation. In step 525, virtual machine file system $220_A$ appends the update operation structure to the end of primary disk image 300. In step 530, virtual machine file system $220_A$ further transmits the update operation structure to each of secondary servers $200_B$, $200_C$, and $200_H$. In one embodiment, the update operation structure is transmitted to the secondary servers using HTTP or other similar network communication protocols. In step 535, virtual machine file system $220_A$ replaces the stored copy of the previous private unique id obtained in step 515 with the private unique id of the current update operation generated in step 505 (i.e., H (s | parent | data), not H (H (s | parent | data)). In step 540, virtual machine file system $220_A$ obtains the physical address corresponding to the appended update operation in primary disk image 300 and inserts the physical address into its B-tree data structure such that the physical address can be found by providing the logical block address of the write operation to the B-tree data structure.

In step 545, the virtual machine file system for each of the secondary servers receives the update operation structure. In step 550, each virtual machine file system of the secondary servers extracts the parent id entry 430, which is the private unique id of the previous update operation, known only to primary server $200_A$ prior to transmission of the update operation structure to the secondary servers in step 530, from the received update operation structure and generates, in step 555, a hash of the parent id entry 430. In step 560, each virtual machine file system of the secondary servers extracts the id entry 425 from the last update operation in its secondary disk image replica. Similar to the id entry 425 of the update operation structure constructed in step 520, id entry 425 extracted in step 560 is the public unique id that was created by virtual machine file system $220_A$ for the prior update operation. In step 565, if the generated hashed parent id equals the public unique id stored as the id entry 425 of the last update operation of the secondary disk image, then in step 570, the virtual machine file system of the secondary server confirms that the received update operation structure originated from primary server $220_A$ and appends the received update operation structure to the end of its secondary data image (respectively, 305, 310 and 315 for primary disk image 300). In step 575, the virtual machine file system of the secondary server obtains the physical address corresponding to the appended update operation in the secondary data image and inserts the physical address into its B-tree data structure. However, if, in step 565, the generated hashed parent id does not equal the public unique id stored as the id entry 425 of the last update operation of the secondary disk image, then the received update operation structure is rejected in step 580.

Figure 6:
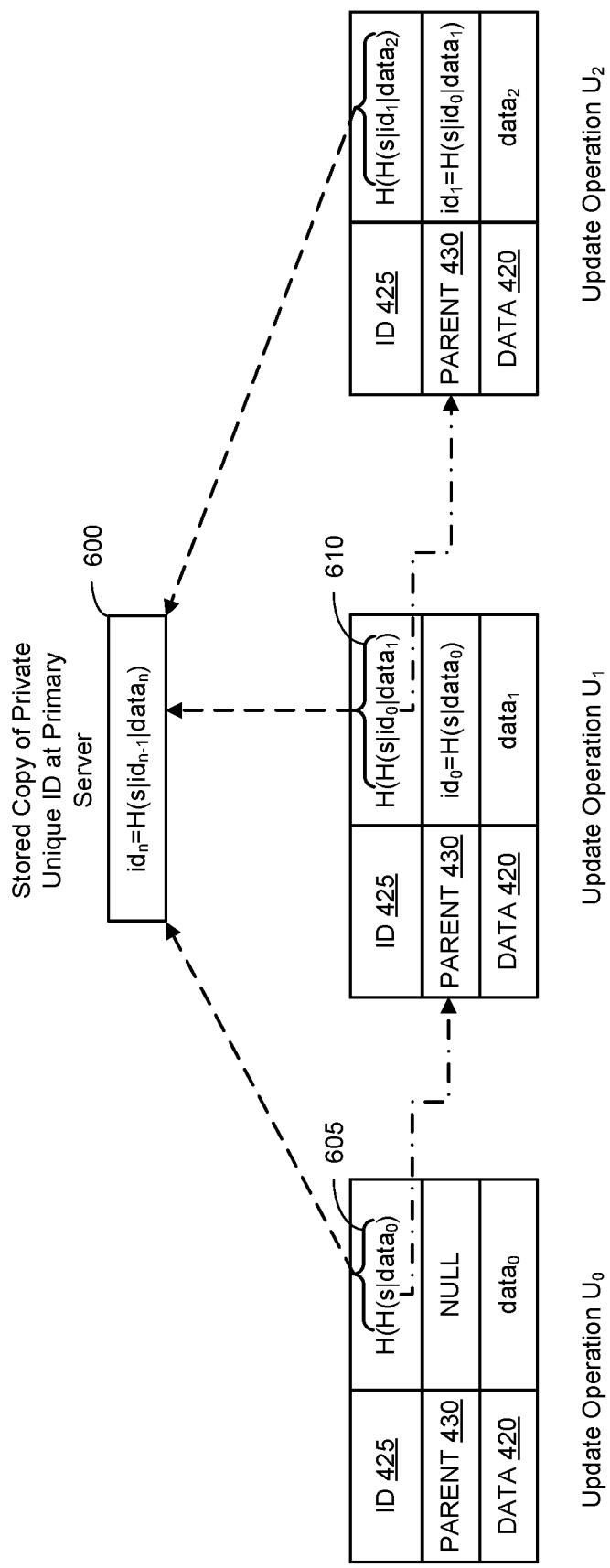
FIG. 6 depicts a sequence of update operations to a data image, according to one or more embodiments of the present invention.

The steps depicted in FIG. 5 ensure that only update operations generated by the primary server will be accepted and appended by secondary servers to their respective secondary disk images. Specifically, only the virtual machine file system of primary server possesses a copy of the current update operation's private unique id that can be provided as a parent id in a subsequent update operation. All other secondary servers can only obtain the corresponding public unique id that is stored as id entry 425 of the update operation in the secondary disk image. To further illustrate the relationship between update operations, FIG. 6 depicts a sequence of update operations to a data image, according to one or more embodiments of the present invention. While update operations in FIG. 6 have been illustrated with only the id entry 425, parent id entry 430 and data portion 420 for exemplary purposes, it should be recognized that update operations, in accordance with one or more embodiments of the invention, may include additional fields and information, including, for example, data information entry 435. As previously discussed, the primary server keeps a memory buffer 600 that stores the current private unique id corresponding to the last entry of the primary data image. This is the stored copy of the private unique id that is obtained in step 515 and subsequently replaced in step 535. Of note, this stored copy of the current private unique id is an unhashed version of the public unique id that is generated in step 510 and stored in the id entry 425 of the corresponding update operation. For example, if a current private unique id is H (s | parent | data)), then id entry 425 for the corresponding update operation in the primary and secondary disk images contains a derived public unique id, H (H (s | parent | data)). As is apparent due to the nature of hash functions, only a primary server has access to private unique id stored in buffer 600 and no other server in a cluster, including the secondary servers that have access to the corresponding public unique id in id entry 425 of the last update operation in their secondary disk images, can determine or otherwise derive the private unique id stored in buffer 600. Update operation $U_O$ of FIG. 6 represents a first update operation of a disk image that is currently stored on the primary disk images and all secondary disk images. A private unique id 605, H (s | data$_0$), is generated by the virtual memory file system as in step 505 and then hashed, in step 510, prior to being stored as a public unique id in the id entry 425 of update operation $U_0$. Private unique id 605 is then subsequently stored in memory buffer 600 of primary server in step 535. Parent id entry 430 of update operation $U_0$ is NULL because it is the first update operation for the disk image. The primary server generates the next update operation $U_1$ by creating a new private unique id 610 by hashing that intersection of its master secret token s, the new data for the update operation $U_1$, and the current id, id$_o$, stored in buffer 600, H (s id$_0$ | data$_1$), where id$_0$ is H (s| data$_o$). The parent id entry 430 of update operation $U_1$ is the id$_0$. When update operation $U_1$ is forwarded to the secondary servers in step 530, the secondary servers are able to confirm that update operation $U_1$ originates from primary server by verifying in step 565 that the hash of the parent id of received update operation $U_1$, H (id$_o$), is equal to the id entry 425 of currently stored update operation Uo, H (H (s data$_0$)).

Figure 7:
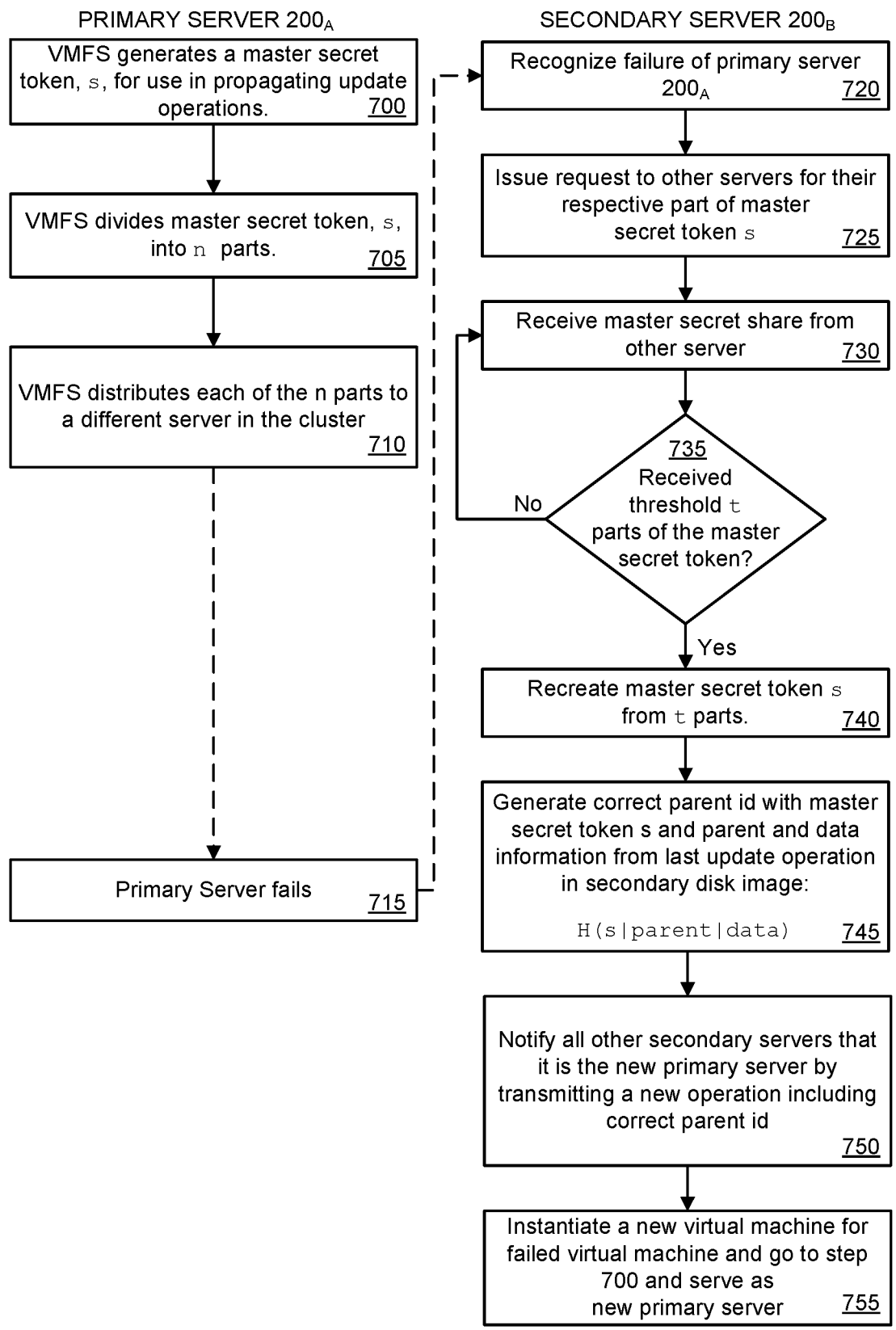
FIG. 7 depicts a flow chart for sharing a master secret token across a number of servers, according to one or more embodiments of the present invention.

To avoid losing the master secret token in the event that a primary server fails, one or more embodiments of the present invention utilize a secret sharing protocol to distribute the master secret token across other servers in a manner that does not actually reveal the master secret token. FIG. 7 depicts a flow chart for sharing a master secret token across a number of servers, according to one or more embodiments of the present invention. In step 700, a virtual machine file system of a primary server, such as virtual machine file system $220_A$, generates a master secret token, s, to be used to propagate update operations to secondary servers to be stored in secondary disk images, for example, in accordance with the flow of FIG. 5. Prior to utilizing the master secret token s (e.g., in accordance with the flow of FIG. 5), in step 705, the virtual memory file system divides the master secret token s into n parts or shares. The n shares have a characteristic that the combination of any threshold number t of the n shares can recreate the master secret token s. In step 710, the virtual memory file system of the primary server distributes each of the n shares to a different server in the cluster. It should be recognized that known secret sharing techniques such as Shamir's secret sharing, Blakley's secret sharing and other similar secret sharing methods may be used to divide and reconstruct master secret s in accordance with embodiments of the invention.

Upon a failure of primary server $200_A$, as in step 715, a secondary server, such as secondary server $200_B$, may recognize the failure of primary server $200_A$ in step 720. For example, in one embodiment, a designated server with failover management responsibilities may inform secondary server $200_E$ of the failure of primary server $200_A$ and instruct secondary server $200_B$ to become the new primary server and initiate failover procedures. In an alternative embodiment, secondary server $200_B$ may itself discover the failure of primary server $200_A$ (i.e., using its own monitoring capabilities) and initiate voting procedures, for example, by utilizing Lamport's Paxos algorithm or similar known voting algorithms, to become the new primary server, potentially competing with other secondary servers that have also recognized the failure of the primary server and initiated their own voting procedures to become the new primary server. For example, in step 725, secondary server $200_B$ issues a request to other servers in the cluster for their respective shares of the master secret token s possessed by failed primary server $200_A$. In steps 730 and 735, secondary server 200B continues to receive master secret token shares until it has received a threshold t of master secret token shares. In an embodiment having competing secondary servers, another secondary server may obtain the threshold t of master secret token shares before secondary server $200_B$, for example, if the secondary servers follow the rules of acceptance in accordance with Lamport's Paxos algorithm or similar algorithms. In step 740, secondary server 200B is able to generate master secret token s from the t shares. In step 745, secondary server $200_B$ generates a correct parent id for a new update operation by hashing the intersection of master secret token s, the parent id of the last update operation in its secondary disk image, and the data from the last update operation: H (s | parent | data). In step 750, secondary server $200_B$ notifies all the other secondary servers that it has assumed responsibilities as the new primary server by transmitting a "view-change" update operation that contains the correct version of the parent id generated in step 745. In step 755, the secondary server $200_E$ instantiates a new virtual machine and associates it with its secondary disk image for the failed virtual machine of the failed primary server, assumes responsibility as the new primary server and generates and subsequently propagates a newly generated master key token by returning to step 700.

It should be recognized that various modifications and changes may be made to the specific embodiments described herein without departing from the broader spirit and scope of the invention as set forth in the appended claims. For example, although the foregoing embodiments have described in the context of updating virtual machine disk images in a replicated and decentralized virtualization data center, it should be recognized that any system having any log files or objects (or files or object that may be structured as logs according to the teachings herein) that are replicated over multiple computers or devices may utilize the techniques disclosed herein to ensure exclusive access to such file or object. Similarly, alternative embodiments may transmit other types of operations to be appended into a disk image instead of or in addition to update operations. For example, one embodiment may include a "branch" and a delete operation, where the branch operation enables a new disk image to be created based on the current disk image without requiring knowledge of the master secret token such that any server in the cluster can request the creation of such a new disk image (for example, for snapshotting purposes) and the delete operation enables the deletion of an entire disk image. Alternative embodiments may utilize other techniques to generate a unique id. For example, rather than creating a hash of the intersection of the master secret token, parent id and current data, alternative embodiments may create a hash of the intersection of the master secret token and the current data or the parent id, or generate a unique id in any other manner consistent with its use as described herein. In one embodiment, the unique id may be a 160 bit value. In another alternative embodiment, a virtual machine file system may utilize a 64 bit indexed B-tree that tracks entire extents rather than individual block locations. Server clusters of alternative embodiments may employ a combination of shared storage, such as a SAN, and local storage in the servers themselves. For example, in one such embodiment, a primary server both stores a primary disk image for a virtual machine on a SAN such that other servers networked to the SAN can failover the virtual machine, and also propagates update operations corresponding to the virtual machine to secondary disk images in the local storage units of other secondary servers in order to provide additional safeguards in the event of a failure of the SAN. In yet another alternative embodiment, each server of a cluster includes its own local storage and is also networked to a shared SAN. Severs in such an embodiment may utilize local storage consistent with the teachings herein and access the SAN in the event that its local storage fails or is otherwise full. Alternatively, servers in such an embodiment may utilize the SAN as its primary storage and resort to local storage only upon a failure of the SAN. It should be recognized that various other combinations of using both a shared storage and local storage units may be utilized consistent with the teachings herein.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A cluster of hardware servers, each of which is configured with a virtualization software layer to support execution of virtual computing instances, the cluster of hardware servers comprising:
  a first hardware server in which a first virtual computing instance is executing, the first hardware server including a first file system which manages access to a first physical disk by the first virtual computing instance, wherein the first file system is configured to:
    receive a write operation issued by the first virtual computing instance;
    capture the write operation as an entry in a first log file stored in the first physical disk, wherein the entry includes a first identifier associated with a previous update operation included as another entry in the first log file; and
    transmit the entry to the hardware servers, including, at least a second hardware server; and
  the second hardware server, networked to the first hardware server, in which a second virtual computing instance is executing, the second hardware server including a second file system which manages access to a second physical disk by the second virtual computing instance, wherein the second file system is configured to:
    receive the entry including the first identifier from the first hardware server;
    compare a hash of the first identifier to a second identifier included in a previous entry in a replica of the first log file stored in the second physical disk; and add the entry to the replica of the first log file stored in the second physical disk when the hash of the first identifier equals the second identifier; or reject the entry when the hash of the first identifier does not equal the second identifier.

2. The cluster of hardware servers according to claim 1, further comprising:

a third hardware server, networked to the first hardware server, in which a third virtual computing instance is executing, the third hardware server including a third file system which manages access to a third physical disk by the third virtual computing instance, wherein the third file system is configured to:

receive the entry including the first identifier from the first hardware server;

compare the hash of the first identifier to a third identifier included in a previous entry in another replica of the first log file stored in the third physical disk; and add the entry to the other replica of the first log file stored in the third physical disk when the hash of the first identifier equals the third identifier; or reject the entry when the hash of the first identifier does not equal the third identifier.

3. The cluster of hardware servers according to claim 1, wherein the entry further includes data for the write operation and descriptive data about the data for the write operation.

4. The cluster of hardware servers according to claim 3, wherein the descriptive data about the data for the write operation includes a logical block address and a corresponding physical block address of the first physical disk at which the data for the write operation is to be stored.

5. The cluster of hardware servers according to claim 3, wherein the first hardware server is further configured to:

generate the first identifier using a token of the first hardware server.

6. The cluster of hardware servers according to claim 5, wherein a part of the token of the first hardware server is stored in the second physical disk.

7. The cluster of hardware servers according to claim 1, wherein each of the first and second virtual computing instances is a virtual machine.

8. In a cluster of hardware servers including first and second hardware servers that are networked to each other, each of which is configured with a physical disk and a virtualization software layer to support execution of virtual computing instances, a method of executing write operations issued by virtual computing instances to virtual disks thereof, said method comprising:

capturing, by a first file system of the first hardware server, write operations, issued by a first virtual computing instance executing in the first hardware server, as first entries in a first log file stored in a first physical disk of the first hardware server, wherein the first entries include first identifiers associated with previous update operations included as other entries in the first log file;

capturing, by a second file system of the second hardware server, write operations issued by a second virtual computing instance executing in the second hardware server, as second entries in a second log file stored in a second physical disk of the second hardware server;

determining to capture the write operations captured in the first log file as the first entries in a replica of the first log file that is stored in the second physical disk of the second hardware server, wherein determining to capture the write operations captured in the first log file as the first entries in the replica of the first log file comprises, for each write operation:

comparing a hash of the first identifier included in the first entry corresponding to the write operation to a second identifier included in a previous entry in the replica of the first log file stored in the second physical disk; and capturing the write operation captured in the first log file in the replica of the first log file stored in the second physical disk of the second hardware server when the hash of the first identifier equals the second identifier; or not capturing the write operation captured in the first log file in the replica of the first log file stored in the second physical disk of the second hardware server when the hash of the first identifier does not equal the second identifier.

9. The method according to claim 8, wherein the cluster of hardware servers further includes a third hardware server, networked to the first hardware server, in which a third virtual computing instance is executing, the third hardware server including a third physical disk, the method further comprising:

capturing, by a third file system of the third hardware server, write operations issued by the third virtual computing instance executing in the third hardware server, as third entries in a third log file stored in the third physical disk of the second hardware server;

determining to capture the write operations captured in the first log file as the first entries in another replica of the first log file that is stored in the third physical disk of the third hardware server, wherein determining to capture the write operations captured in the first log file as the first entries in the other replica of the first log file comprises, for each write operation:

comparing a hash of the first identifier included in the first entry corresponding to the write operation to a third identifier included in a previous entry in the other replica of the first log file stored in the third physical disk; and capturing the write operation captured in the first log file in the other replica of the first log file stored in the third physical disk of the third hardware server when the hash of the first identifier equals the third identifier; or not capturing the write operation captured in the first log file in the other replica of the first log file stored in the third physical disk of the third hardware server when the hash of the first identifier does not equal the third identifier.

10. The method according to claim 8, wherein each of the first entries further includes data for the write operation and descriptive data about the data for the write operation.

11. The method according to claim 10, wherein the descriptive data about the data for the write operation includes a logical block address and a corresponding physical block address of the first physical disk of the first hardware server at which the data for the write operation is to be stored.

12. The method according to claim 10, wherein the first identifier is generated using a token of the first hardware server.

13. The method according to claim 12, wherein a part of the token of the first hardware server is stored in the second physical disk of the second hardware server.

14. The method according to claim 8, wherein each of the first and second virtual computing instances is a virtual machine.

15. A non-transitory computer readable medium comprising instructions to be executed in a cluster of hardware servers that are networked to each other, wherein each hardware server is configured with a physical disk and a virtualization software layer to support execution of virtual computing instances, wherein the instructions, when executed by one or more processors, cause the one or more processors to perform operations comprising:

capturing, by a first file system of a first hardware server, write operations, issued by a first virtual computing instance executing in the first hardware server, as first entries in a first log file stored in a first physical disk of the first hardware server, wherein the first entries include first identifiers associated with previous update operations included as other entries in the first log file;

determining to capture the write operations captured in the first log file as the first entries in a replica of the first log file that is stored in a second physical disk of a second hardware server in the cluster of hardware servers, wherein determining to capture the write operations captured in the first log file as the first entries in the replica of the first log file comprises, for each write operation:

comparing a hash of the first identifier included with the first entry corresponding to the write operation to a second identifier included in a previous entry in the replica of the first log file stored in the second physical disk; and capturing the write operation captured in the first log file in the replica of the first log file stored in the second physical disk of the second hardware server when the hash of the first identifier equals the second identifier; or not capturing the write operation captured in the first log file in the replica of the first log file stored in the second physical disk of the second hardware server when the hash of the first identifier does not equal the second identifier.

16. The non-transitory computer readable medium according to claim 15, wherein each of the first entries further includes data for the write operation and descriptive data about the data for the write operation.

17. The non-transitory computer readable medium according to claim 16, wherein the descriptive data about the data for the write operation includes a logical block address and a corresponding physical block address of the first physical disk of the first hardware server at which the data for the write operation is to be stored.

18. The non-transitory computer readable medium according to claim 16, wherein the first identifier is generated using a token of the first hardware server.

19. The non-transitory computer readable medium according to claim 18, wherein a part of the token of the first hardware server is stored in the second physical disk of the second hardware server.

20. The non-transitory computer readable medium according to claim 15, wherein the virtual computing instances are virtual machines.

* * * * *